(12) United States Patent
Sotgiu

(10) Patent No.: US 9,517,667 B2
(45) Date of Patent: Dec. 13, 2016

(54) TIRE MOUNTING TOOL ASSEMBLY

(71) Applicant: Snap-on Equipment Srl a unico socio, Correggio (IT)

(72) Inventor: Paolo Sotgiu, Modena (IT)

(73) Assignee: SNAP-ON EQUIPMENT SRL A UNICO SOCIO, Correggio (RE) (IT)

( * ) Notice: Subject to any disclaimer, the term of this patent is extended or adjusted under 35 U.S.C. 154(b) by 287 days.

(21) Appl. No.: 14/291,436

(22) Filed: May 30, 2014

(65) Prior Publication Data

US 2015/0343864 A1 Dec. 3, 2015

(51) Int. Cl.
*B60C 25/138* (2006.01)
*B60C 25/05* (2006.01)

(52) U.S. Cl.
CPC ......... *B60C 25/138* (2013.01); *B60C 25/0593* (2013.04)

(58) Field of Classification Search
CPC ....... B60C 25/12; B60C 25/125; B60C 25/138
See application file for complete search history.

(56) References Cited

U.S. PATENT DOCUMENTS

2005/0241776 A1* 11/2005 Gonzaga ............ B60C 25/0551
157/1.17

FOREIGN PATENT DOCUMENTS

EP    1 946 946 A1    7/2008
WO   2012052970 A1   4/2012

OTHER PUBLICATIONS

Extended European Search Report issued in European Application No. 14170635.8-1760 dated Nov. 20, 2014.

\* cited by examiner

*Primary Examiner* — David B Thomas
(74) *Attorney, Agent, or Firm* — McDermott Will & Emery LLP

(57) ABSTRACT

A tire mounting/demounting tool assembly for a tire mounting/demounting machine comprises a carrier unit having a first as well as a second end and being provided with first support means for receiving a bead breaker tool and second support means for receiving a mounting support tool, a bead breaker tool for loosening the tire bead from the rim edge of a wheel, having a first as well as a second end, the first end is provided with at least one bead breaker tool element and the second end is adapted to be mounted to the carrier unit via the first support means, and a mounting support tool for supporting the mounting of at least one tire bead of a tire to be mounted on a rim, the mounting support tool having a first as well as a second end, the first end is provided with a mounting support tool element and the second end is adapted to be mounted to the carrier unit via the second support means. The shape of the bead breaker tool element and the shape of the mounting support tool are at least partially congruent to each other.

13 Claims, 4 Drawing Sheets

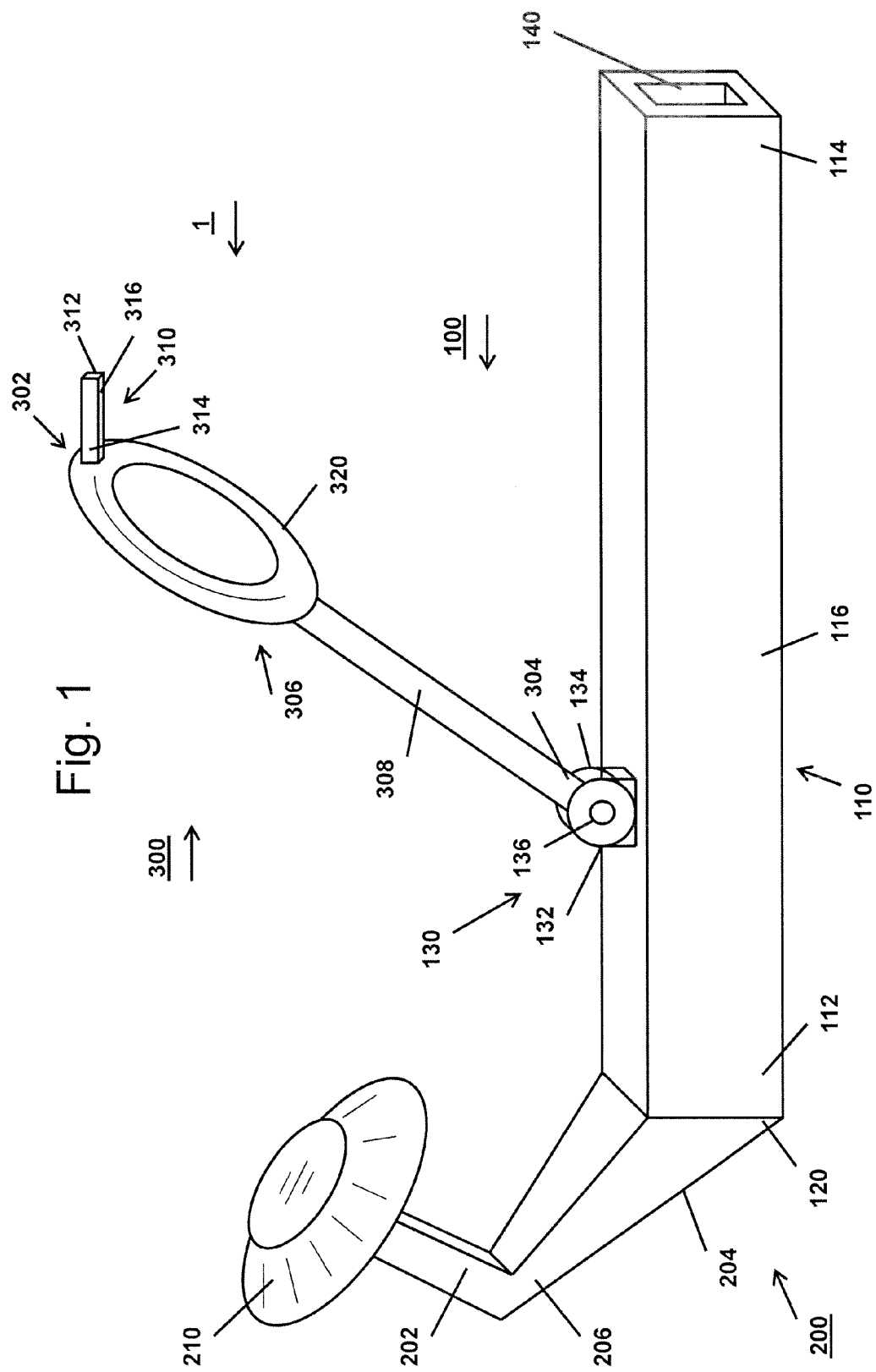

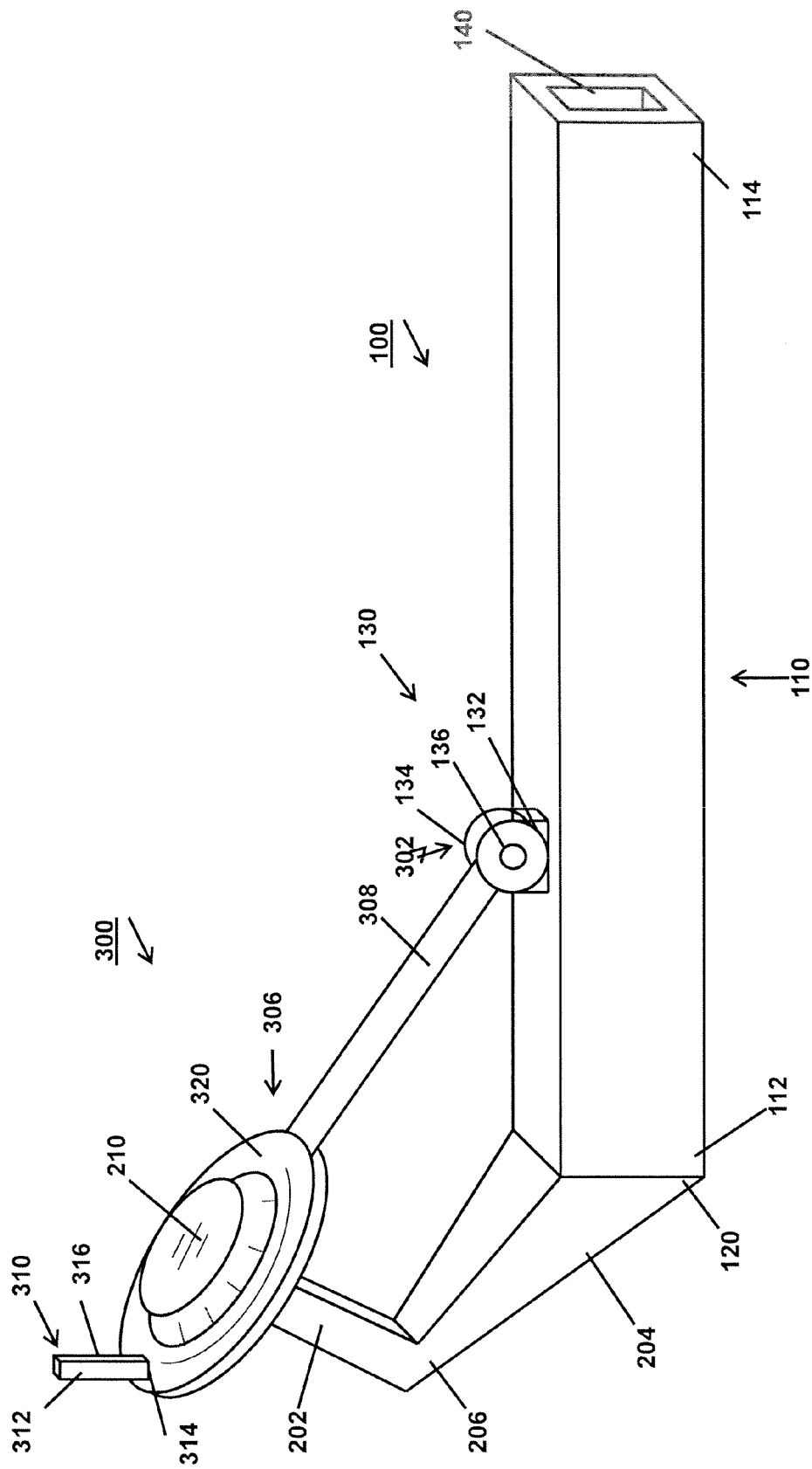

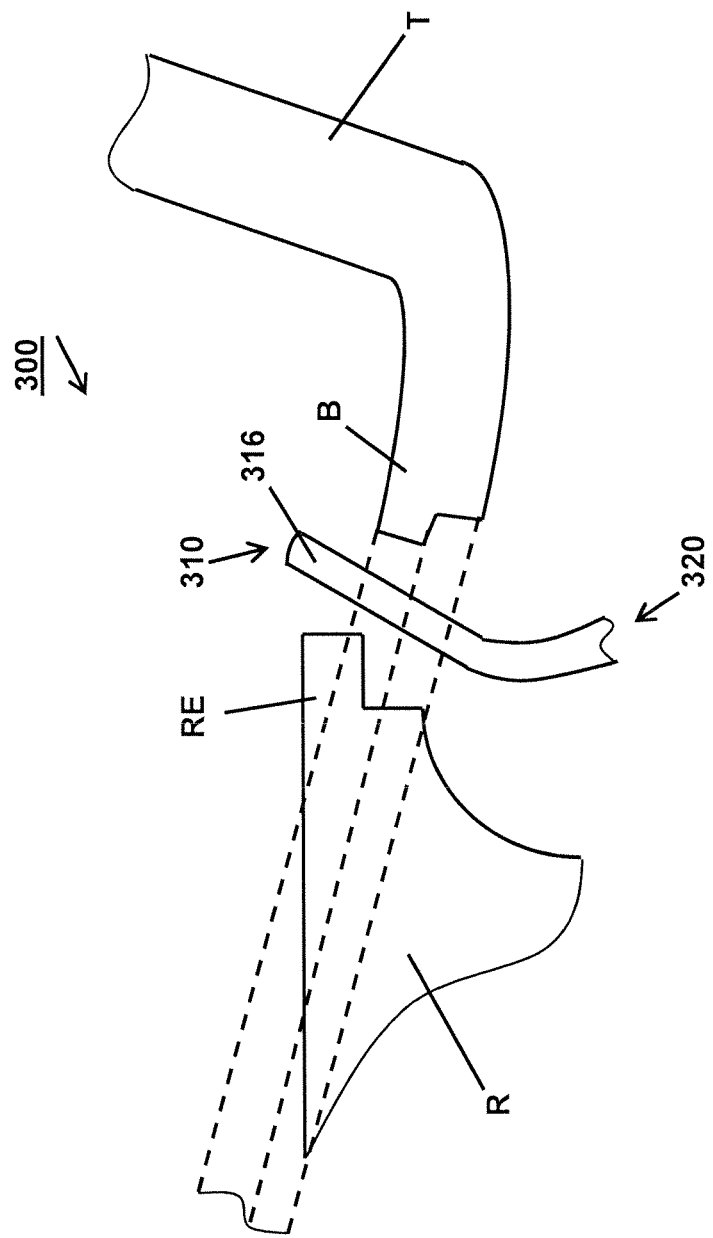

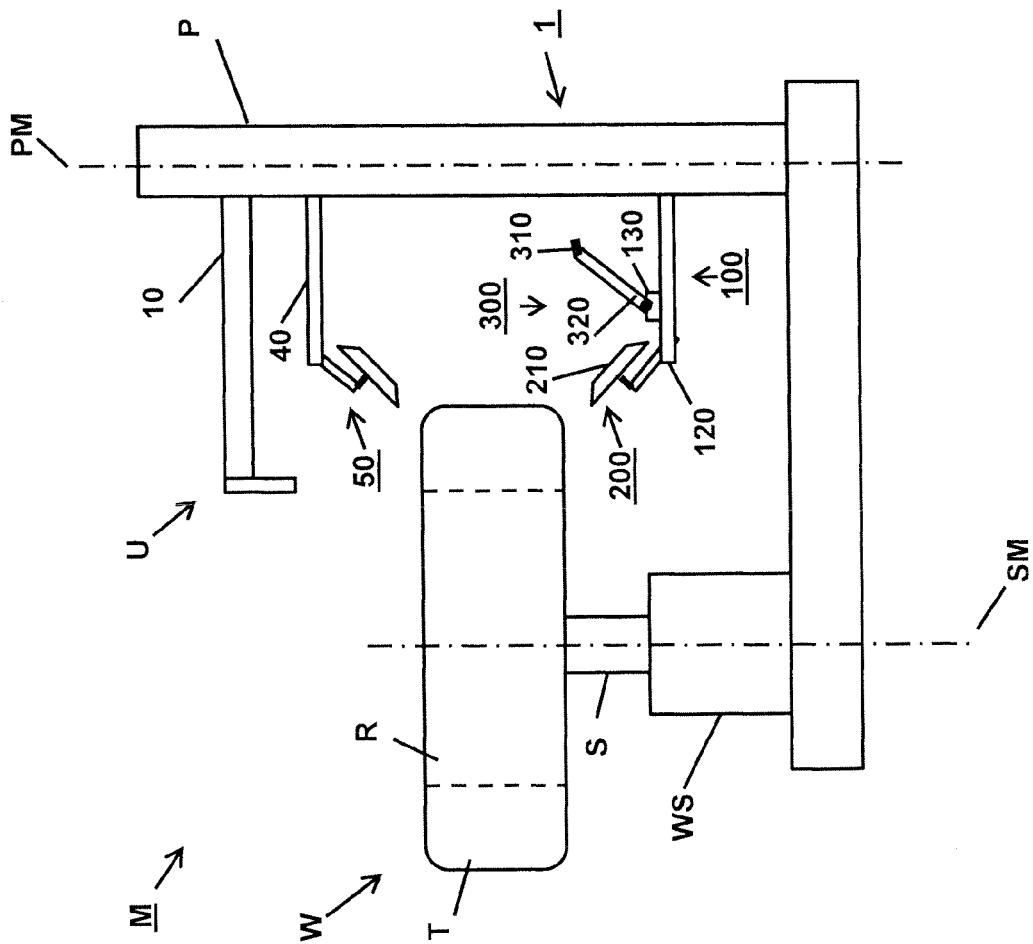

TIRE MOUNTING TOOL ASSEMBLY

The present invention relates to a tyre support tool assembly for a tyre mounting/demounting machine, which comprises a carrier unit having a first as well as a second end and being provided with first support means for receiving a bead breaker tool and second support means for receiving a mounting support tool, a bead breaker tool for loosening the tyre bead from the rim edge of a wheel having a first as well as a second end, the first end is provided with at least one bead breaker tool element and the second end is adapted to be mounted to the carrier unit via the first support means, and a mounting support tool for supporting the mounting of at least one tyre bead of a tyre to be mounted on a rim, the mounting support tool having a first as well as a second end, the first end is provided with at least one mounting support tool element and the second end is adapted to be mounted to the carrier unit via the second support means. The present invention further relates to a mounting support tool for supporting the mounting of at least one tyre bead of a tyre to be mounted on a rim, which is adapted to be mounted to the carrier unit of the carrier unit of a tyre mounting/demounting machine.

In practice, tyre mounting/demounting machines are known for mounting a tyre to or demounting a tyre from a rim of a vehicle wheel which comprise a wheel support having a shaft and clamping means for rotatably and reversibly holding a rim of a wheel from which a tyre is to be demounted or to which a tyre is to be mounted during the mounting/demounting procedure. Mounting and demounting tools being provided on or several tool carrier arms, are supported at at least one tool support post along which the one or several tool carrier arms can be moved. The tools can include bead breakers for loosening the tyre bead from the rim edge. Moreover, the tools can also comprise a removal tool for gripping and moving the tyre bead of the tyre to be demounted out of the rim.

Conventionally, each of the tool carrier arms is provided with one mounting tool, one demounting tool or an upper and a lower bead breaker tool. In theses cases, the tyre mounting/demounting machines are provided with a large number of tool arms which has to be controlled commonly or separately, respectively. Such tyre mounting/demounting machines are of a complex design and require an increased control effort.

Moreover, in case that a mounting tool and a demounting tool are supported by the same tool carrier arm, an increased effort of controlling is necessary, i.e. for choosing and precise positioning the respective mounting or demounting tool.

Thus, it is an object of the present invention to provide a mounting/demounting tool assembly for mounting and demounting a tyre to or from a wheel rim, which is of a simple construction and which needs less control efforts. It is a further object of the present invention to provide a tyre mounting/demounting machine to which the inventive mounting/demounting tool assembly is attached, and in which the control amount is reduced.

According to the present invention, there is provided a mounting/demounting tool assembly for a tyre mounting/demounting machine. The mounting/demounting tool assembly comprises a carrier unit having a first and a second end and being provided with a first support means for receiving a bead breaker tool and second support means for receiving a mounting support tool, a bead breaker tool for loosening the tyre from the rim edge of a wheel, having a first as well as a second end, the first end is provided with at least one bead breaker tool element and the second end is adapted to be mounted to the carrier unit via the first support means, and a mounting support tool for supporting the mounting of at least one tyre bead of a tyre to be mounted on a rim, the mounting support tool having a first as well as a second end, the first end is provided with at least one mounting support tool element and the second end is adapted to be mounted to the carrier unit via the second support means. In the inventive mounting/demounting tool assembly, the shape of the bead breaker tool element and the shape of the mounting support tool and/or the mounting support tool element are at least partially congruent to each other.

A mounting/demounting tool assembly according to the present invention thereby enables to provide both, a bead breaker and a mounting support tool, on the same tool carrier arm. Thus, no additional tool carrier arm for the bead breaker is necessary, whereby the design and control amount of the mounting/demounting machine is reduced. Additionally, the least partially congruent shapes of the bead breaker tool element and the mounting support tool and/or the mounting support tool element provide sufficient supporting contact between the bead breaker tool element and the mounting support tool for preventing unintentional vertical or lateral movement during the mounting process. In an advantage configuration, the mounting support tool in the region of its first end has a shape that is at least partially congruent to the shape of the bead breaker tool element.

In this arrangement, the support of the mounting support tool and/or its tool element by the bead breaker tool element is provided close to the first end of the mounting support tool, where the mounting support tool element is arranged. Thereby, unintentional movement of the mounting support tool element, e.g. caused by bending of the mounting support tool, may be omitted.

In a preferred embodiment of the inventive mounting/demounting tool assembly, the mounting support tool is pivotally attached to the second support means of the carrier unit with its second end, for being reversibly pivoted between an inoperative position and an operative position.

The pivot movement is a non-complex movement and can be executed manually or automatically with a simple mechanism, whereby the control effort may be reduced.

For further reducing the control effort, e.g. by omitting an additional drive, the bead breaker tool may be fixedly attached to the first support means of the carrier unit in its operative position. Naturally, the bead breaker tool may also be removable attached to the first support means of the carrier unit. In this case, the bead breaker tool is in its operative position when mounted to the carrier arm unit, and in its inoperative position when removed from the carrier arm unit.

In an alternative embodiment, the bead breaker tool has an operative position and an inoperative position, and wherein the bead breaker tool is pivotally attached to the first support means of the carrier unit with its second end, for being reversibly pivoted between the inoperative position and the operative position.

The mounting support tool may have any suitable shape and may be realized in various designs. In an advantageous configuration, the mounting support tool has an operative position for supporting the mounting of a tyre bead and wherein the mounting support tool has in the region of its first end an engagement portion for being adapted to come at least partially into engagement with the bead breaker tool element, when in its operative position. The specific shape of the engagement portion of the mounting support tool enables sufficient supporting contact between the mounting support tool and the bead breaker tool during the mounting process, prevents unintentional. e.g. lateral or vertically downward movement of the mounting support tool, and secures the mounting support tool in its operative position.

The engagement portion of the mounting support tool may have any suitable shape, which e.g. at least partially matches the shape of the bead breaker tool element. It is preferred that the bead breaker tool element has a conical shape, like a complete cone having a tip end or a truncated cone with a planar top surface, and the engagement portion of the mounting support tool has an at least approximately circular shape adapted to be engaged by the bead breaker tool element, when the mounting support tool is in its operative position.

In case that the bead breaker tool element is of a conical shape, the engagement portion of the mounting support tool may have an at least approximately ring-shape which is engaged by the bead breaker tool element, when the mounting support tool is in its operative position. A ring-shaped engagement portion enables a correct positioning on and a secure engagement of the mounting support tool by the bead breaker tool element.

The engagement portion may also have any other suitable shape which may be engaged by the bead breaker tool element, like a conical cap, or any suitable opening into which the bead breaker tool element may engage, like a rectangular or triangular opening. Naturally, in case that the bead breaker tool element has a shape different from the conical shape, like a cylindrical shape, also the engagement portion may have a non-conical shape at least partially matching the shape of the bead breaker tool element.

The pivot movement of the mounting support tool between an inoperative or resting position and an operative position enables a correct and easy positioning of the mounting support tool in the operative position. In this position, the engagement portion of the mounting support tool is supported by the bead breaker tool element, whereby unintentional vertical or lateral movement during the mounting process may be omitted.

For enabling the mounting of at least one of the tyre beads to the rim, and for preventing the tyre bead from being damaged, in a preferred configuration, the mounting support tool element has a guiding surface for guiding the at least one tyre bead of a tyre to be mounted on a rim.

In a specific embodiment of the mounting/demounting tool assembly, the mounting support tool element is at least approximately hook-shaped, and the guiding surface is arranged at the inner side of the hook-shaped mounting support tool element facing in the direction of the second end of the carrier unit. It has to be understood that the inner surface of the hook-shaped mounting support tool element faces away from the rim and towards the tyre to be mounted on the rim. A hook-shaped mounting support tool element enables a secure engagement and guidance of the tyre bead during the mounting process.

According to a further preferred embodiment of the inventive tyre mounting/demounting tool assembly, the carrier unit comprises an adapter portion adapted to be mounted to a tool carrier arm of a tyre mounting/demounting machine, in particular to an already existing tool carrier arm.

Said adapter unit allows an easy and secure positioning of the inventive tyre mounting/demounting tool assembly to the tool carrier arm of different tyre mounting and demounting machines. This means that the inventive tyre mounting/demounting tool assembly may be provided as an accessory or upgrade assembly for existing tyre mounting machines.

According to an alternative embodiment, the carrier unit may be a part of a tool carrier arm of a tyre mounting/demounting machine. In this configuration, the control unit of the specific tyre mounting/demounting machine may be adapted to the specific embodiment of the mounting/demounting tool assembly.

According to the present invention, there may be provided a mounting support tool for supporting the mounting of at least one tyre bead of a tyre to be mounted on a rim. The mounting support tool has a first as well as a second end, the first end is provided with a mounting support tool element and the second end is adapted to be mounted to the tool carrier arm, particularly to the lower bead breaker arm of an existing tyre mounting/demounting machine. In this configuration, the mounting support tool may be provided as an upgrade part for being mounted to a tool carrier arm of an existing tyre mounting/demounting machine.

It has to be understood that the mounting support tool may be of a configuration as disclosed in conjunction with the present invention. Moreover, it has to be noted that the inventive mounting support tool and its component belonging to it, as well as the inventive mounting support tool assembly, all as described above, can be used independently from the inventive mounting/demounting tool unit described also above.

Further advantages and embodiments of the present invention will be described in the following together with the drawings listed below. The expression "left", "right", "below" and "above" used in the following description, are referred to the drawings in an alignment such that the reference numbers and the notation of the figures used, can be read in normal.

In the drawings:

FIG. 1 is a schematic view to an embodiment of a mounting/demounting tool assembly according to the present invention, with the mounting support tool in the inoperative position;

FIG. 2: is a schematic view to the embodiment of the mounting/demounting tool assembly of FIG. 1, with the mounting support tool in the operative position;

FIG. 3: is a detailed view to the mounting support tool element of the inventive mounting support tool in the operative position; and FIG. 4: is a tyre mounting/demounting machine with a mounting/demounting tool assembly according to the present invention.

FIG. 1 is a schematic view to an embodiment of a mounting/demounting tool assembly 1 according to the present invention, with a mounting support tool 300 in the inoperative position.

The mounting/demounting tool assembly 1 comprises a carrier unit 100, a bead breaker tool 200 and a mounting support tool 300. In FIG. 1, bead breaker tool 200 is in its operative position, whereas mounting support tool 300 is in its inoperative position.

As it can be seen in FIG. 1, carrier unit 100 has an at least approximately horizontally arranged carrier arm portion 110, which has a first or left end 112 and a second or right end 114, and a straight mid portion 116. Carrier arm portion 110, according to FIG. 1, has a rectangular cross section including a top surface 118, and can be made of steel.

On top surface 118 of carrier arm portion 110, a second support means 130 for receiving mounting support tool 300 is provided. Support means 130, according to this specific embodiment, are in the form of a hinge having a first hinge portion 132 which is fixedly attached to top surface 118 of carrier arm portion 110, and a second hinge portion 134 mounted to mounting support tool 300. First and second hinge portions 132, 134 of support means or hinge 130, are pivotally connected to each other by a hinge bolt 136. Hinge 130 allows a pivot movement of mounting support tool 300 about hinge bolt 136, which is at least approximately horizontally arranged and which extends in a direction approximately rectangular to the longitudinal extension of carrier arm portion 110 and vertical to a plane extending through carrier arm portion 110.

Bead breaker tool 200 for loosening a tyre bead TB from a rim edge RE of a wheel rim R has a first end 202 with a bead breaker tool element 210 in the form of a truncated cone. Bead breaker tool element or truncated cone 210 is preferably rotatable attached to first end 202 of bead breaker 200. Bead breaker tool 200 further has a mid-portion 206 between its first and second ends 202, 204. Mid-portion 206 is curved such that the upper border or edge of the outer surface of cone 210 is aligned at least approximately in a horizontal plane, with its base surface facing away from carrier arm portion 110, and its top surface facing upwardly and towards carrier arm portion 110, such that said upper border or edge comes in contact with the tyre bead TB to be loosened.

Bead breaker tool 200 has a second end 204, by means of which bead breaker tool 200 is mounted to the first end 112 of carrier arm portion 110 of carrier unit 100. According to the embodiment of tyre mounting/demounting tool assembly 1 of FIG. 1, bead breaker tool 200 is detachably mounted to first end 112 of carrier arm portion 210 by first support means 120 for reversibly accommodating bead breaker tool 200, and which comprise an insertion portion provided at second end 204 of bead breaker tool 200, which is inserted into a respective receiving portion provided on first end 112 of carrier arm portion 110 (both are not visible in FIG. 1). Naturally, bead breaker tool 200 may also be fixedly attached to the first end 112 of carrier arm portion 110 with its second end 204, e.g. by welding or the like.

In a specific configuration of mounting/demounting tool assembly 1, first support means 120 may also realized by a hinge, wherein a first hinge member is attached to first end 112 of carrier arm portion 110 and a second hinge member is attached to second end 204 of bead breaker tool 200. Bead breaker tool 200 is than pivotally attached to carrier arm portion 110, and may reversibly pivoted between the operative position and an inoperative position.

Mounting support tool 300 has a first end 302, a second end 304 and a mid-portion 306. Mounting support tool 300 is pivotally attached to tool carrier arm portion 110 by its first end, at which second hinge portion 134 of hinge 130 is provided, which forms second support means 130 for receiving or bearing mounting support tool 300.

Second end 304 of mounting support tool 300 is formed by a mounting support tool element 310 which in operation engages at least one tyre bead TB of a tyre T to be mounted, for mounting said tyre bead TB to a rim edge RE of a wheel rim R (as shown in FIG. 3). Mounting support tool element 310 has a longitudinally extending body of an at least approximately rectangular cross-section, with a first end 312 and a second end 314, and a guiding surface 316 for guiding the at least one tyre bead TB of the tyre T to be mounted on the rim R. Guiding surface 316 is formed by the surface of mounting support tool element 310, facing towards tool carrier arm portion 110, when mounting support tool 300 is in its inoperative position, particularly, facing towards the second end 114 of carrier arm portion 110. Mounting support tool element 310 is attached to mid-portion 306 of mounting support tool 300 by its second end 314.

Mid-portion 306 of mounting support tool 300 includes an at least approximately ring-shaped portion 320, which forms an engagement portion being arranged blose to or in the region of the second end 304 of mounting support tool 300. The circular shape of ring-shaped portion 320 is congruent to the shape of a plane through truncated cone 210 of bead breaker tool 200 and parallel to its base surface. The plane in which ring-shaped portion 320 extends, or the plane of the ring, is at least approximately rectangular aligned to a plane extending vertically through carrier arm portion 110. The size of ring-shaped portion 320, and its opening, respectively, is selected to match with the outer diameter of at least one section of bead breaker tool element or truncated cone 210 of bead breaker 200. A rod-shaped portion 308 extends between ring-shaped portion 320 and second end 304 of mounting support tool 300, the length of which is adapted to the distance between truncated cone 210 of bead breaker 200 and the position of second support means or hinge 130, such that ring-shaped portion 320 is supported by truncated cone 210 of bead breaker 200, when in the operative position (cf. FIG. 2).

Mounting support tool 300 may be made of any suitable material. It is preferred that mounting support tool 300 is made of metal. In order to avoid damages of tyre bead TB, mounting support tool element 310 may additionally be provided with a coating, e.g. of plastic.

Further according to FIG. 1, right end 114 of carrier arm portion 110 is provided with an accommodation portion 140 in the form of a blind hole having an approximately rectangular cross-section. Accommodation portion 140 extends from the outer end of second end 114 of carrier arm portion 110 into carrier arm portion 110 along its central axis. The length or depth of accommodation portion 140 corresponds to a respective insertion portion provided on the tool carrier arm of a mounting/demounting machine M, to which mounting/demounting tool arrangement 1 may be attached (cf. FIG. 4).

Naturally, respective securing elements have to be provided for securing mounting/demounting tool assembly 1 when attached to a tool carrier arm of the mounting/demounting machine M. It is also possible that carrier arm portion 110 is provided with an insertion portion and that the tool carrier arm of the mounting/demounting machine M comprises a respective accommodation portion.

Insertion portion and accommodation portion may have other than the above described configurations. Essentially is a form-fit coupling between mounting/demounting tool assembly 1 and the tool carrier arm of the mounting/demounting machine M, for a correct positioning and support of mounting/demounting tool arrangement 1 on said tool carrier arm.

FIG. 2 is a schematic view to the embodiment of the mounting/demounting tool assembly 1 of FIG. 1, with the mounting support tool 300 in the operative position.

As it can be seen in FIG. 2, in its operative position, mounting support tool 300 is pivoted towards bead breaker 200, about hinge bolt 136 and in a plane extending vertically and in the longitudinal extension of carrier arm portion 110. In the operative position, truncated cone 210 of bead breaker 200 engages ring-shaped portion 320 forming an engagement portion of mounting support tool 300, and at least partially extends there trough. Ring-shaped portion 320, and thus, mounting support tool 300, is supported by bead breaker 200, when in the operative position.

As it further can be seen in FIG. 2, in the operative position, mounting support tool element 310 is arranged at ring-shaped portion 210 such that it faces upwardly, with guiding surface 316 facing towards second end 114 of carrier arm portion 110. That means that guiding surface 316 faces away from rim R to which a tyre T has to be mounted. Mounting support tool element 310 and rod-shaped portion 308 are arranged in the plane extending vertically and in the longitudinal extension of carrier arm portion 110, or in the pivot plane, but with an angle with regard to their longitudinal extension. This angle ensures the correct positioning of mounting support tool element 310 with respect to rim R and tyre bead TB of the tyre T to be mounted (cf. FIG. 3).

As it further can be seen in FIG. 2, in the operative position, ring-shaped portion 320 of mounting support tool 300 is at least approximately parallel to the base surface of truncated cone 210 of bead breaker 200, enabling a ring-shaped contact between truncated cone 210 and ring-shaped portion 320.

FIG. 3 is a detailed view to the mounting support tool element 310 of the inventive mounting support tool 300 in the operative position, and arranged closed to the rim edge RE of rim R to which tyre T has to be mounted.

Mounting support tool element 310 of mounting support tool 300 is positioned between rim edge RE of rim R and tyre bead TB of tyre T to be mounted, and in an angle relative to the vertical axis of rim R such that first end 312 of mounting support tool element 310 slopes towards tyre bead TB. Guiding surface 316 faces towards tyre bead TB of tyre T.

The length of mounting support tool element 310 and the angle between mounting support tool 310 and rod-shaped portion 308, or ring-shaped portion 320, respectively, are selected such that mounting support tool element 310 is positioned at least approximately vertically above bead breaker tool element or truncated cone 210, particularly, approximately vertically above the edge of the base surface of truncated cone 210, when mounting support tool 300 is in the operative position, for enabling a correct contact between mounting support tool element 310 and tyre bead TB during the mounting operation. This arrangement of mounting support tool element 310 ensures a correct guidance of tyre bead TB for passing rim edge RE during the mounting operation without damaging tyre bead TB or rim edge RE.

FIG. 4 is a tyre mounting/demounting machine M with a mounting/demounting tool arrangement 1 according to the present invention. Mounting/demounting machine M includes a machine base B and a wheel support WS with a shaft S on which a rim R of a wheel W from which a tyre T is to be demounted or to which a tyre T is to be mounted, respectively, can rotatably be clamped. Wheel support WS and shaft S are arranged on machine base B such that the center line SM of shaft S and wheel support WS extends vertically. Rim R of wheel W clamped on shaft S, can be arranged at the free end of shaft S such that its mid-plane is horizontally oriented. In the casing of wheel support WS, a drive device, like an electric motor, is arranged for rotating shaft S and the rim R of wheel W during the mounting and demounting procedure.

Moreover, on machine base B, a tool support post P is arranged such that the center line PM of tool support post P extends at least substantially parallel to the center line SM of wheel support WS and shaft S, respectively. Tool support post P has a horizontal distance to wheel support WS and shaft S such that a complete wheel W, i.e. including a rim R and a tyre T, can reversibly be mounted on shaft S and can freely be rotated by the aforesaid drive device without interference with support post P.

On tool support post P, a mounting/demounting tool unit U is arranged on the free end of a tool carrier arm 10 which extends at least substantially horizontal. Tool carrier arm 10 can reversibly be moved along tool support post P by a not shown drive device, like an electric motor or pneumatic or hydraulic cylinder/piston device, respectively. Furthermore, tool carrier arm 10 can be coupled or can include a further drive device, like an electric motor or pneumatic or hydraulic cylinder/piston device, respectively, for at least reversibly moving mounting/demounting tool unit U in the horizontal direction. In principle, it is also possible that at least mounting/demounting tool unit U (but also a part or the whole tool carrier arm 10) can horizontally be moved by hand. Moreover, tool carrier arm 10 can pivotally be arranged at tool support post P such that tool carrier arm 10 can be pivoted in a horizontal plane wherein this pivot movement can be carried out by hand or by a drive device, respectively.

Mounting/demounting machine M also includes an upper bead breaker carrier arm 40 with an upper bead breaker tool 50.

Mounting/demounting machine M further includes a lower tool carrier arm or carrier unit 100 as a part of the mounting/demounting tool arrangement 1, carrying bead breaker tool 200 and mounting support tool 300 according to the present invention.

Both bead breaker tools, upper bead breaker tool 50 and lower bead breaker tool 200, can reversibly and independent from each other be moved along tool support post P by not shown drive devices, like electric motors or pneumatic or hydraulic cylinder/piston devices, respectively, wherein one drive devices can be provided for each of bead breaker tools 50, 200 or commonly for both devices. Furthermore, bead breaker tools 50, 200 can be coupled or can include a further drive device, like an electric motor or pneumatic or hydraulic cylinder/piston device, respectively, for at least reversibly moving bead breaker tools 50, 200 in the horizontal direction. In principle, it is also possible that at least bead breaker tools 50, 200 (but also a part or the whole tool carrier arms 112, 122) can horizontally be moved by hand. Moreover, bead breaker carrier arms 40, 100 can pivotally be arranged at tool support post P such that both carrier arms 40, 100, or at least one of them, can be pivoted in a horizontal plane wherein this pivot movement can be carried out by hand or by a drive device, respectively.

According to the present invention, on lower tool carrier arm or carrier unit 100, which may form said lower carrier arm, bead breaker tool 200 and mounting support tool 300 are arranged and supported by first and second support means 120, 130, and may be moved together with carrier unit 100 vertically along support post P, or horizontally, manually, or by a respective drive.

For mounting at least one tyre bead TB of a tyre T on a rim R, said rim R is positioned and clamped on shaft S of wheel support WS. Thereafter, mounting/demounting tool assembly 1 with mounting support tool 300 in its operative position as shown in FIG. 2, is moved towards the upper rim edge RE of rim R. Mounting support tool element 310 is positioned close to rim edge RE and laterally thereto. A tyre T to be mounted is placed on rim R and with a portion of its lower tyre bead TB encompassing mounting support tool element 310, as shown in FIG. 3. With tyre T in this position, rim R is rotated about its vertical axis. By rotating rim R about at least one complete revolution, the lower tyre bead TB, guided by guide surface 316 of mounting support tool element 310, is moved over upper rim edge RE of rim R.

Thereafter, carrier unit 100 of mounting/demounting tool assembly 1 is lowered for disengaging mounting support tool 300 from tyre T.

The further mounting process is executed by mounting/demounting tool unit U which engages upper tyre bead TB of tyre T for urging upper tyre bead TB over upper rim edge RE of rim R.

It has to be noted that it is also possible to move wheel support WS towards the mounting/demounting tools and/or the bead breaker tools instead of moving said tool towards rim R clamped on wheel support WS.

REFERENCES

B machine base
M mounting/demounting machine
P support post
PM center line
R rim
RE rim edge
S shaft
SM center line
T tyre
TB tyre bead
U mounting/demounting tool unit
W wheel
WS wheel support
1 mounting/demounting tool assembly
10 tool carrier arm
40 upper bead breaker carrier arm
50 upper bead breaker tool
100 lower bead breaker carrier arm
110 carrier arm portion
112 first end 112
114 second end 114
116 straight mid portion
118 top surface
120 first support means
130 support means, hinge
132 first hinge portion
134 second hinge portion
136 hinge bolt
140 accommodation portion
200 lower bead breaker tool
202 first end
204 second end
206 mid-portion
210 bead breaker tool element
300 mounting support tool
302 first end
304 second end
306 mid-portion
308 rod-shaped portion
310 mounting support tool element
312 first end
314 second end
316 guiding surface
320 ring-shaped portion

The invention claimed is:

1. A tyre mounting/demounting tool assembly for a tyre mounting/demounting machine, comprising:
 a carrier unit having a first as well as a second end and being provided with first support means for receiving a bead breaker tool and second support means for receiving a mounting support tool,
 a bead breaker tool for loosening the tyre bead from the rim edge of a wheel, having a first as well as a second end, the first end is provided with at least one bead breaker tool element and the second end is adapted to be mounted to the carrier unit via the first support means, and
 a mounting support tool for supporting the mounting of at least one tyre bead of a tyre to be mounted on a rim, the mounting support tool having a first as well as a second end, the first end is provided with at least one mounting support tool element and the second end is adapted to be mounted to the carrier unit via the second support means
 wherein the shape of the bead breaker tool element and the shape of the mounting support tool are at least partially congruent to each other.

2. The tyre mounting/demounting tool assembly according to claim 1,
 wherein the mounting support tool in the region of its first end has a shape that is at least partially congruent to the shape of the bead breaker tool element.

3. The tyre mounting/demounting tool assembly according to claim 1,
 wherein the mounting support tool is pivotally attached to the second support means of the carrier unit with its second end, for being reversibly pivoted between an inoperative position and an operative position.

4. The tyre mounting/demounting tool assembly according to claim 1,
 wherein the bead breaker tool is fixedly attached to the first support means of the carrier unit in an operative position.

5. The tyre mounting/demounting tool assembly according to claim 1,
 wherein the bead breaker tool has an operative position and an inoperative position, and wherein the bead breaker tool is pivotally attached to the first support means of the carrier unit with its second end, for being reversibly pivoted between the inoperative position and the operative position.

6. The tyre mounting/demounting tool assembly according to claim 1,
 wherein the mounting support tool has an operative position for supporting the mounting of a tyre bead and wherein the mounting support tool has in the region of its first end an engagement portion for being adapted to come at least partially into engagement with the bead breaker tool element, when in its operative position.

7. The tyre mounting/demounting tool assembly according to claim 6,
 wherein the bead breaker tool element has a conical shape, and the engagement portion of the mounting support tool has an at least approximately circular shape adapted to be engaged by the bead breaker tool element, when the mounting support tool is in its operative position.

8. The tyre mounting/demounting tool assembly according to claim 7,
 wherein the engagement portion of the mounting support tool has at least approximately ring-shape which is engaged by the bead breaker tool element, when the mounting support tool is in its operative position.

9. The tyre mounting/demounting tool assembly according to claim 1,
 wherein the mounting support tool element has a guiding surface for guiding the at least one tyre bead of a tyre to be mounted on a rim.

10. The tyre mounting/demounting tool assembly according to claim 9, wherein the mounting support tool element is at least approximately hook-shaped, and wherein the guiding surface is arranged at the inner side of the hook-shaped mounting support tool element, facing in the direction of the second end of carrier unit.

11. The tyre mounting/demounting tool assembly according to claim 1,
wherein the carrier unit comprises an adapter portion adapted to be mounted to a tool carrier arm of a tyre mounting/demounting machine.

12. The tyre mounting/demounting tool assembly according to claim 1,
wherein the carrier unit is a part of a tool carrier arm of a tyre mounting/demounting machine.

13. The tyre mounting/demounting tool assembly according to any of claims 1-12, wherein
the at least one mounting support tool element is only one mounting support tool element.

\* \* \* \* \*